US012613656B1

(12) United States Patent (10) Patent No.: US 12,613,656 B1

Marupaka et al. (45) Date of Patent: Apr. 28, 2026

(54) DYNAMIC PATH SELECTION BASED ON SCHEDULER'S RESOURCE ALLOCATION DOMAIN (SRAD) OF I/O BUFFERS AND ADAPTERS

(71) Applicant: INTERNATIONAL BUSINESS MACHINES CORPORATION, Armonk, NY (US)

(72) Inventors: Ramesh Kumar Marupaka, Hyderabad (IN); Sanket Rathi, Hyderabad (IN); Nidhyanandhan Arumugam, Hyderabad (IN); Phani Kumar V. U. Ayyagari, Hyderabad (IN); Chaitanya Paturu, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 18/931,242

(22) Filed: Oct. 30, 2024

(51) Int. Cl.
*G06F 3/06* (2006.01)

(52) U.S. Cl.
CPC ............ *G06F 3/0656* (2013.01); *G06F 3/061* (2013.01); *G06F 3/0635* (2013.01); *G06F 3/067* (2013.01)

(58) Field of Classification Search
CPC ...... G06F 3/0656; G06F 3/061; G06F 3/0636; G06F 3/067
USPC .................................................. 711/153, 154
See application file for complete search history.

(56) References Cited

U.S. PATENT DOCUMENTS

| | | | |
|---|---|---|---|
| 9,606,837 B2 | 3/2017 | Chen et al. | |
| 10,079,729 B2 | 9/2018 | Beckman et al. | |
| 10,296,389 B2 * | 5/2019 | Chen ..................... | G06F 9/5022 |
| 10,976,934 B2 | 4/2021 | Kumar et al. | |
| 11,567,669 B1 | 1/2023 | Charles et al. | |
| 2004/0267980 A1 | 12/2004 | Mcbrearty et al. | |
| 2017/0131938 A1 * | 5/2017 | Kumar .................. | G06F 3/0665 |
| 2017/0147224 A1 * | 5/2017 | Kumar .................. | G06F 3/0611 |
| 2020/0348869 A1 * | 11/2020 | Gokam ................. | H04L 45/121 |
| 2021/0181947 A1 | 6/2021 | Patel et al. | |
| 2021/0297363 A1 * | 9/2021 | Charles .................. | H04L 45/28 |
| 2022/0229562 A1 * | 7/2022 | Patel ..................... | G06F 3/0613 |

* cited by examiner

*Primary Examiner* — Than Nguyen

(74) *Attorney, Agent, or Firm* — Onyx IP Group

(57) ABSTRACT

Dynamic path selection based on SRAD of I/O buffers and adapters includes: receiving, by a driver, an allocation of an input/output (I/O) buffer for an I/O request targeting a storage device; selecting a path to the storage device for carrying out the I/O request based on a buffer SRAD associated with the I/O buffer; and sending the IO request via the selected path connected to the adapter belonging to same SRAD as I/O buffer.

20 Claims, 4 Drawing Sheets

200

DYNAMIC PATH SELECTION BASED ON SCHEDULER'S RESOURCE ALLOCATION DOMAIN (SRAD) OF I/O BUFFERS AND ADAPTERS

BACKGROUND

Field of the Disclosure

The field of the disclosure is data processing, or, more specifically, methods, systems, and products for dynamic path selection based on scheduler's resource allocation domain (SRAD) of I/O buffers and adapters.

Description of Related Art

MPIO (Multipath Input/Output) emerged as a solution to the limitations of traditional single-path storage connections. In these systems, a failure in the single path could lead to data loss or system downtime. MPIO addressed this issue by providing redundancy and improved fault tolerance to enhance the reliability and performance of storage systems. MPIO creates multiple connections between a server and a storage device, providing redundancy and fault tolerance. If one path fails, MPIO automatically switches to a working path, ensuring minimal downtime. Additionally, MPIO can distribute I/O traffic across multiple paths, improving performance and preventing bottlenecks. However, MPIO path selection software may not always select the most efficient path, which can lead to increased latency and decreased system efficiency and performance.

SUMMARY

Methods, apparatus, and systems for dynamic path selection based on SRAD of I/O buffers and adapters according to various embodiments are disclosed in this specification. In accordance with one aspect of the present disclosure, a method of dynamic path selection based on SRAD of I/O buffers and adapters includes receiving, by a driver, an allocation of an input/output (I/O) buffer for an I/O request targeting a storage device, selecting a path to the storage device for carrying out the I/O request based on a buffer SRAD associated with the I/O buffer, and sending the I/O request via the selected path.

In accordance with another aspect of the present disclosure, a system for dynamic path selection based on SRAD of I/O buffers and adapters may include a processor set, one or more computer-readable storage media, and program instructions stored on the one or more computer-readable storage media configured to cause the processor set to perform operations including: receiving, by a driver, an allocation of an input/output (I/O) buffer for an I/O request targeting a storage device, selecting a path to the storage device for carrying out the I/O request based on a buffer SRAD associated with the I/O buffer, and sending the I/O request via the selected path.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
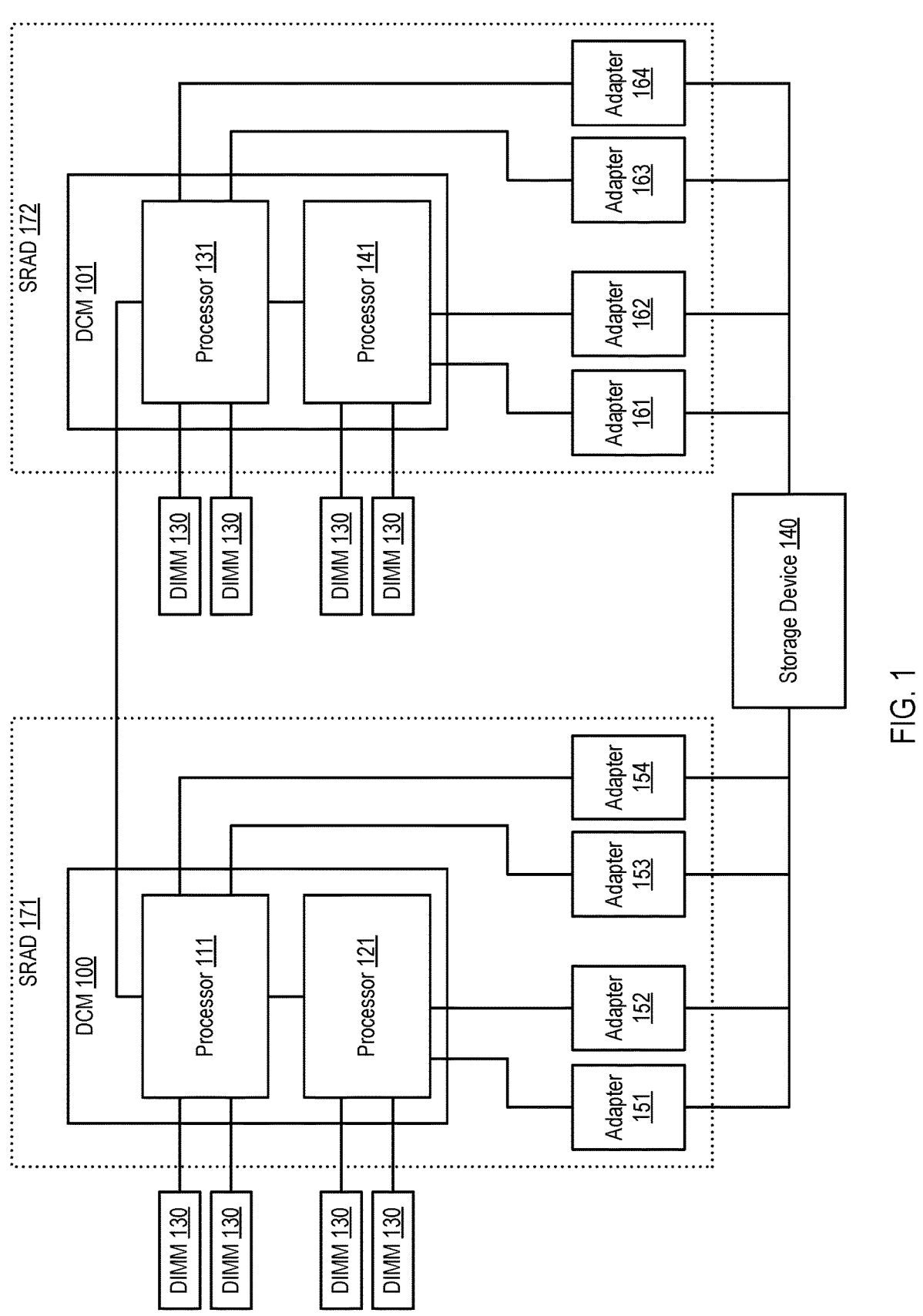
FIG. 1 is a block diagram of an example system configured for dynamic path selection based on SRAD of I/O buffers and adapters in accordance with embodiments of the present disclosure.

Exemplary methods, systems, and products for dynamic path selection based on SRAD of I/O buffers and adapters in accordance with the present disclosure are described with reference to the accompanying drawings, beginning with FIG. 1. FIG. 1 sets forth a block diagram of an example system configured for dynamic path selection based on SRAD of I/O buffers and adapters in accordance with embodiments of the present disclosure. The example of FIG. 1 includes multiple processors (such as processors 111, 121, 131, and 141), each coupled to memory (such as DIMMs 130) and adapters (such as adapters 151, 152, 153, 154, 161, 162, 163, and 164), and a storage device 140 coupled to the adapters.

The example system of FIG. 1 includes two different SRADs (SRAD 171 and SRAD 172). An SRAD is a fundamental unit in operating systems that represents a group of closely related processor cores and their associated memory. Other terms for this close-knit group of cores and associated memory include RAD (Resource Affinity Domain or Resource Allocation Domain). An operating system (OS) scheduler, responsible for allocating system resources, may operate within the context of these SRADs. By understanding the capabilities and limitations of each SRAD, the scheduler can more effectively allocate processes to optimize system performance.

In the example of FIG. 1, there is a different SRAD for each DCM (dual chip module), such as SRAD 171 for DCM 100 and SRAD 172 for DCM 101. Each DCM includes two processors (where DCM 100 includes processor 111 and processor 121, and DCM 101 includes processor 131 and processor 141), and each processor is coupled to one or more associated DIMMs (such as DIMMs 130) or Dual Inline Memory Module, which each include RAM (Random Access Memory) local to the processors. Each processor in FIG. 1 is also coupled to a storage device 140 via one or more adapters. For example, DCM 100 is coupled to storage device 140 via adapters 151-154, and DCM 101 is coupled to storage device 140 via adapters 161-164. In the example of FIG. 1, the adapters coupled to processors within each DCM are included within the DCM's associated SRAD. In another embodiment (not shown in FIG. 1) the system may include one or more single chip modules instead of DCMs, where a different SRAD is associated with each single chip module (comprising a single processor) and may include the DCM's associated DIMMs and coupled adapters.

In the example of FIG. 1, each SRAD may be established or assigned via the operating system's kernel services. In one embodiment, the kernel service is configured to, upon establishing each SRAD, assign a number or other name to each SRAD. In one example embodiment, the SRAD may be numbered according to the SRAD's location within the system.

The example system of FIG. 1 implements Multipath Input/Output (MPIO), which improves reliability and performance in computer storage systems by creating multiple connections between a server and a storage device. This redundancy ensures that if one connection fails, the system can automatically switch to another, minimizing downtime and data loss. For example, processor 111 includes two different paths (via two different adapters, e.g., adapter 153 and adapter 154) to the same storage device 140. In some embodiments, the system of FIG. 1 is a NUMA (non-uniform memory access) system. NUMA systems have a memory architecture where different processors have varying access times to different regions of memory (which is in contrast to UMA (Uniform Memory Access) systems where all processors have equal access times to all memory locations).

MPIO systems include MPIO software configured to select a particular path to a storage device (or some other I/O target) in response to receiving an I/O request. In conventional MPIO systems, when an application wants to read or write data to a storage device, it first allocates a buffer in RAM (such as in a DIMM coupled to a processor) for the particular I/O request, and then sends the I/O request to the disk driver. The disk driver, upon receiving the buffer allocation along with the I/O request, then requests the MPIO software to choose the right path for sending along the I/O request. The MPIO software then chooses an available path based on several factors such as load balancing, path quality, or other algorithms (such as Round Robin, Fail_over, and the like). After the MPIO software selects the designated path, the driver sends the I/O request out to the storage device via the selected path so that the storage device may carry out the request.

In such conventional MPIO systems, however, the MPIO software does not take into account SRAD information when selecting a path (such as for MPIO systems having a NUMA architecture) and may end up selecting a path through an adapter having an SRAD different from the SRAD associated with the allocated buffer in the I/O request. In such an example, the system may experience additional latency (such as DMA latency or the like), which may impact system performance. For example, in the system of FIG. 1, if MPIO software selected a path utilizing adapter 154 (in SRAD 171) for an I/O request which allocated a buffer in DIMM 130 coupled to processor 131 (in SRAD 172), the I/O request may experience additional latency due to the MPIO's path selection algorithm not taking into account the SRAD information associated with the available paths and I/O requests. The remaining embodiments of the present disclosure describe exemplary methods, systems, and products for dynamic path selection based on SRAD of I/O buffers and adapters.

The example system of FIG. 1 is configured for dynamic path selection based on SRAD of I/O buffers and adapters. For example, the system includes MPIO software configured to choose a path from an I/O adapter in the same SRAD as the I/O buffer. Such a path selection is carried out by having the MPIO software query the kernel to receive SRAD information about the I/O buffer and then attempting to select an available path using an adapter which is in the same SRAD. Such a path selection process allows for increased I/O throughput by decreasing potential unnecessary latencies.

In the system of FIG. 1, during initialization of each path (such as when an adapter is coupled to the system), the system (such as a driver in the operating system) is configured to obtain the adapter's SRAD information for the newly added path (e.g., based on a determination of which processor or DCM the adapter and path is coupled to) and store the adapter SRAD information in a path structure. The path structure may be a data structure including information associated with each path within the system and may be used by the MPIO software when selecting a path. When an allocated I/O buffer is received via the Disk driver (as part of an I/O request), the MPIO software is configured to respond by identifying the SRAD of the I/O buffer using kernel services. After obtaining the buffer SRAD information, the MPIO software is configured to then select an available path (to the storage device associated with the I/O request) through an adapter that has the same SRAD as the I/O buffer's SRAD. Once the MPIO software has selected a path, the disk driver is configured to use that path for sending along the I/O request. In some embodiments, if a path is not found that utilizes an adapter SRAD matching the buffer SRAD, the MPIO software is configured to instead select an adapter path having a next nearest SRAD to the buffer SRAD. In such an embodiment, the MPIO may select a next nearest path based on the naming scheme (or numbering scheme) associated with the SRADs, where each SRAD has an assigned number by kernel services. In another embodiment, if the selected path is overloaded, the MPIO software is configured to select a non-overloaded path having the next nearest SRAD adapter. In other embodiments, the MPIO software is configured to select a path based on SRAD identification and matching in combination with any other number of other path selection factors or algorithms.

Figure 2:
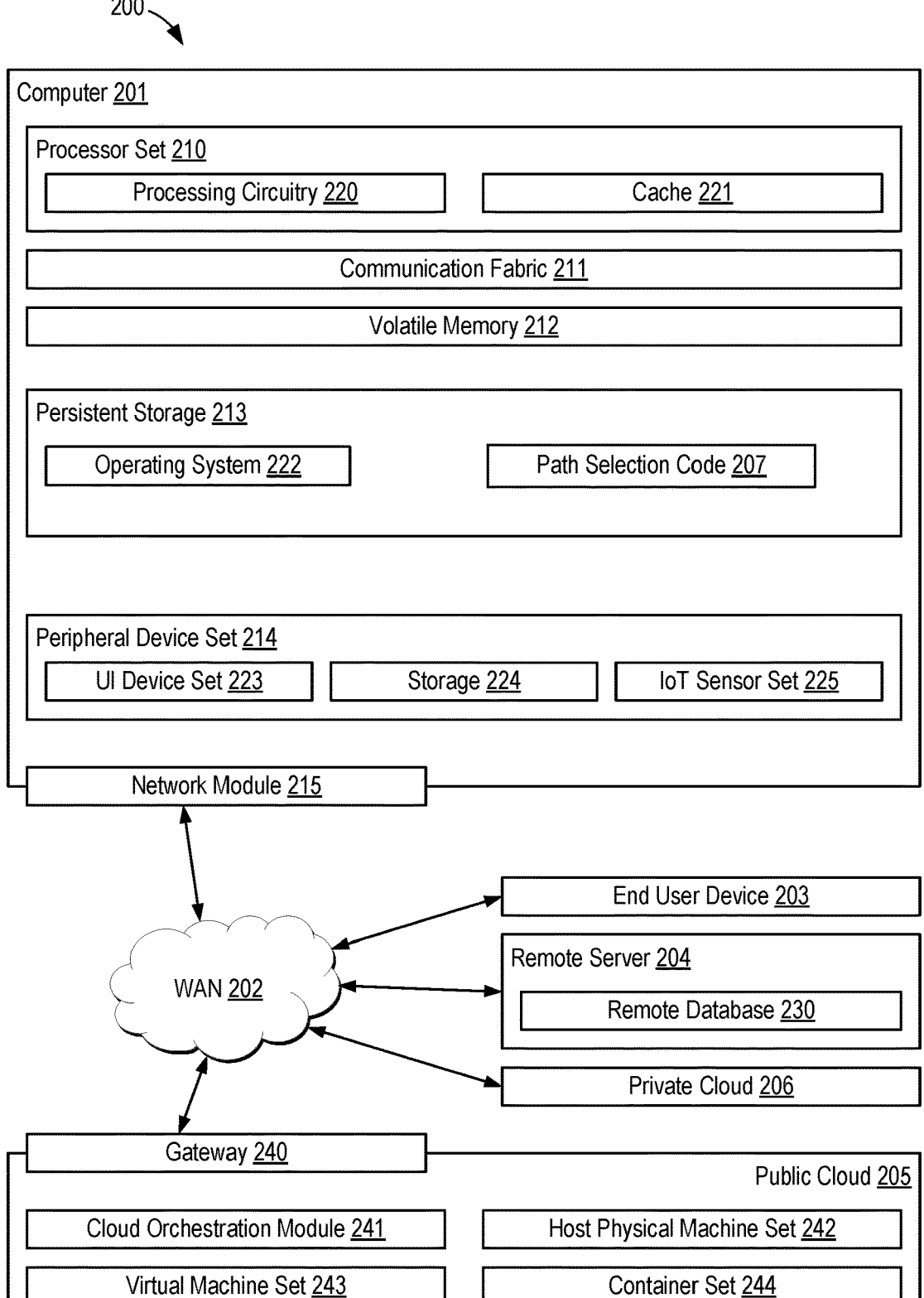
FIG. 2 is a block diagram of an example computing environment configured for dynamic path selection based on SRAD of I/O buffers and adapters according to some embodiments of the present disclosure.

For further explanation, FIG. 2 sets forth a block diagram of computing environment 200 configured for dynamic path selection based on SRAD of I/O buffers and adapters in accordance with embodiments of the present disclosure. Computing environment 200 contains an example of an environment for the execution of at least some of the computer code involved in performing the inventive methods, such as path selection code 207 or operating system 222. In addition to path selection code 207, computing environment 200 includes, for example, computer 201, wide area network (WAN) 202, end user device (EUD) 203, remote server 204, public cloud 205, and private cloud 206. In this example embodiment, computer 201 may include the system shown in FIG. 1, and includes processor set 210 (including processing circuitry 220 and cache 221), communication fabric 211, volatile memory 212, persistent storage 213 (including operating system 222 and path selection code 207, as identified above), peripheral device set 214 (including user interface (UI) device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244. In one embodiment, the path selection code 207 is the MPIO software configured to select a path for I/O requests based on SRAD information obtained from kernel services in operating system 222. In another embodiment, the path selection code 207 is included within the operating system 222.

Computer 201 may take the form of a desktop computer, laptop computer, tablet computer, smart phone, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in path selection code 207 in persistent storage 213.

Communication fabric 211 is the signal conduction path that allows the various components of computer 201 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface-type operating systems that employ a kernel. The code included in path selection code 207 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215. Network module 215 may be configured to communicate with other systems or devices, such as sensors 225, for receiving sensor measurements.

WAN 202 is any wide area network (for example, the internet) capable of communicating computer data over non-local distances by any technology for communicating computer data, now known or to be developed in the future. In some embodiments, the WAN 202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
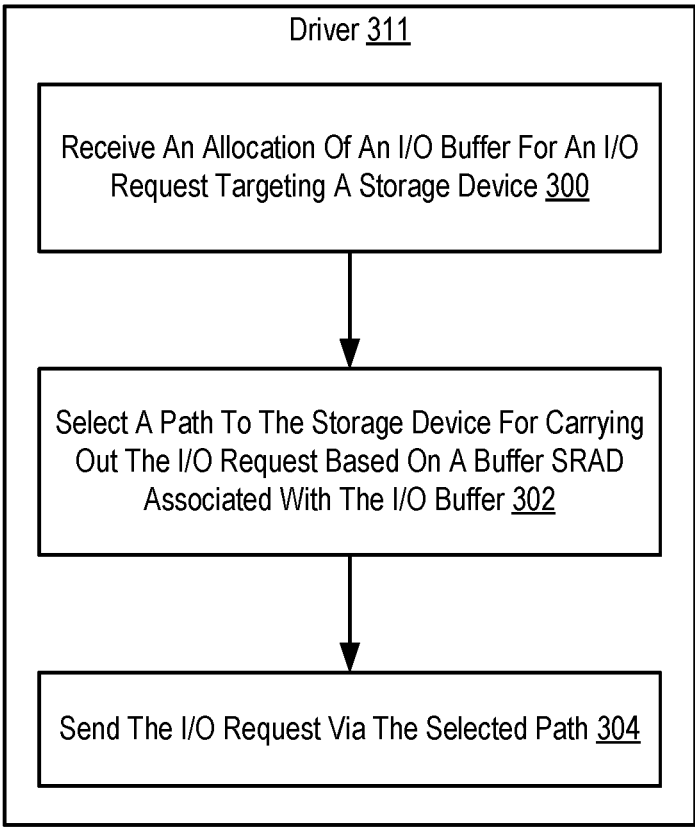
FIG. 3 is a flowchart of an example method for dynamic path selection based on SRAD of I/O buffers and adapters according to some embodiments of the present disclosure.

For further explanation, FIG. 3 sets forth a flow chart illustrating an exemplary method of dynamic path selection based on SRAD of I/O buffers and adapters according to embodiments of the present disclosure. The method of FIG. 3 includes receiving 300 an allocation of an I/O buffer for an I/O request targeting a storage device. Receiving 300 the allocation of an I/O buffer may be carried out by a driver 311 associated with the system shown in FIG. 1. For example, driver 311 may be included in an operating system (OS) (such as operating system 222 of FIG. 2) and configured to select which path an I/O request will be sent to a target. The storage device targeted by the I/O request may be any storage device coupled to the system, with one example storage device being the storage device 140 of FIG. 1. The I/O request may include an identification of an I/O buffer allocated by the application which sent the request. The I/O buffer is included within memory local to a processor, such as RAM included within a DIMM 130 of FIG. 1.

The method of FIG. 3 also includes selecting 302 a path to the storage device for carrying out the I/O request based on a buffer SRAD associated with the I/O buffer. Selecting 302 a path to the storage device for carrying out the I/O request may be carried out by driver 311 based on a buffer SRAD associated with the I/O buffer identified in the I/O request. In one embodiment, the buffer SRAD is determined using kernel services of the operating system. In an example embodiment where the I/O buffer identified in the I/O request is a buffer included in a DIMM 130 coupled to processor 121 in FIG. 1, the driver (or MPIO software) may determine, using kernel services, that SRAD 171 is the buffer SRAD associated with the I/O buffer.

The method of FIG. 3 also includes sending 304 the I/O request via the selected path. Sending 304 the I/O request may be carried out by driver 311 sending the I/O request to the storage device via the selected path that was selected based on the buffer SRAD. By taking into account the SRAD information associated with the I/O request, the driver may improve path selection in MPIO systems (especially those utilizing NUMA architecture) by preventing potential latency-increasing path selections.

Figure 4:
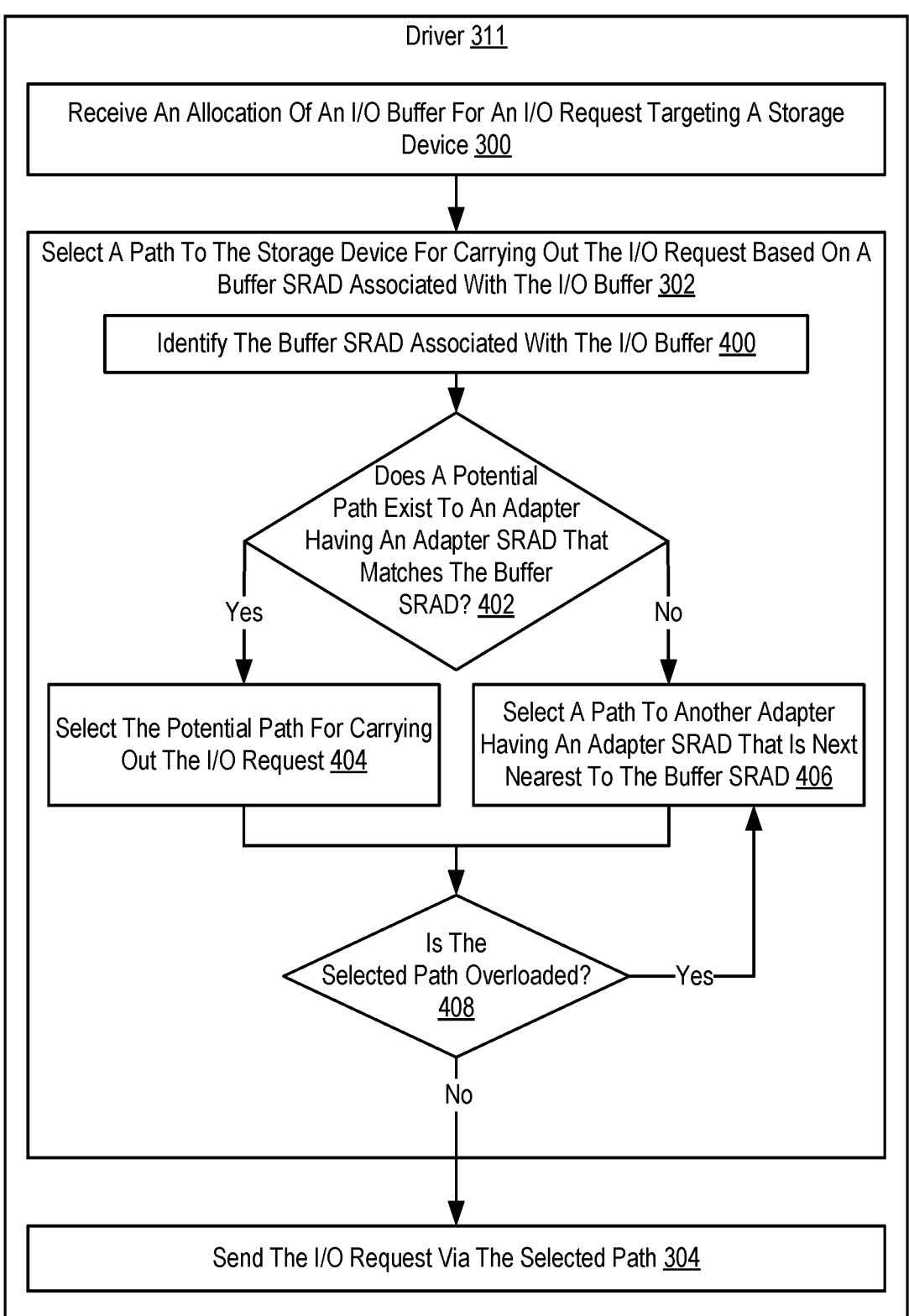
FIG. 4 is a flowchart of another example method for dynamic path selection based on SRAD of I/O buffers and adapters according to some embodiments of the present disclosure.

For further explanation, FIG. 4 sets forth a flow chart illustrating another exemplary method of dynamic path selection based on SRAD of I/O buffers and adapters according to embodiments of the present disclosure. The method of FIG. 4 differs from the method of FIG. 3 in that the method of FIG. 4 further includes, as part of selecting 302 a path to the storage device for carrying out the I/O request based on a buffer SRAD associated with the I/O buffer, identifying 400 the buffer SRAD associated with the I/O buffer. Identifying 400 the buffer SRAD associated with the I/O buffer may be carried out by driver 311 using kernel services of the operating system. For example, the driver, or MPIO software, may query the kernel for SRAD information associated with the particular buffer identified in the I/O request, and receive the buffer SRAD information from the kernel in response to the query. In an example embodiment where the I/O buffer identified in the I/O request is a buffer included in a DIMM 130 coupled to processor 141 in FIG. 1, the driver (or MPIO software) may determine, using kernel services, that SRAD 172 is the buffer SRAD associated with the I/O buffer.

The method of FIG. 4 also includes, as part of selecting 302 a path to the storage device, determining 402 whether a potential path exists to an adapter having an adapter SRAD that matches the buffer SRAD. Determining 402 whether a potential path exists to an adapter having an adapter SRAD that matches the buffer SRAD may be carried out by driver 311 by determining (again using kernel services, or by referencing the path structure associated with all of the available paths) the adapter SRAD of each available adapter and determining which, if any, paths are available that utilize adapters having an adapter SRAD that matches the identified buffer SRAD.

The method of FIG. 4 also includes, as part of selecting 302 a path to the storage device, if a potential path does exist to an adapter having an adapter SRAD that matches the buffer SRAD, selecting 404 the potential path for carrying out the I/O request. Selecting 404 the potential path for carrying out the I/O request may be carried out by driver 311 (or MPIO software) by selecting one of the one or more paths that are determined to having a matching adapter SRAD with the buffer SRAD. In some embodiments, where there are multiple paths that exist with matching SRAD information, the driver (or MPIO software) is configured to consider additional factors or perform additional algorithms (such as path quality, Round Robin, Fail_over, and the like) in order to determine which of the existing paths should be selected.

The method of FIG. 4 also includes, as part of selecting 302 a path to the storage device, if a potential path does not exist to an adapter having an adapter SRAD that matches the buffer SRAD, selecting 406 a path to another adapter having an adapter SRAD that is next nearest to the buffer SRAD. Selecting 406 a path to another adapter having an adapter SRAD that is next nearest to the buffer SRAD may be carried out by driver 311 (or MPIO software) based on a naming or number scheme associated with each of the SRADs of the system. For example, in an embodiment, where each SRAD is numbered 1 through n (where n is the number of SRADs included in the system), the driver may select a path associated with an adapter SRAD having the next closest number to the buffer SRAD (such as an adapter SRAD of 5 if the buffer SRAD is number 4). By selecting a path having the next nearest SRAD, the driver is configured to carry out path selection based on the SRAD of both the buffer and the available adapters even when the SRADs do not match, thereby preventing potential latency-increasing path selections.

The method of FIG. 4 also includes, as part of selecting 302 a path to the storage device, determining 408 whether the selected path is overloaded. Determining 408 whether the selected path is overloaded is carried out by driver 311 (or MPIO software) after selecting a path based on the SRAD information of the buffer and the available paths. Determining that a path is overloaded may include comparing an I/O rate associated with the selected path with an I/O path threshold (where the threshold may be user selected or automatically selected by the OS). If the driver 311 determines 408 that the selected path is overloaded, it is configured to again select 406 a path to another adapter having an adapter SRAD that is next nearest to the buffer SRAD. In such an embodiment, the driver will continue to choose a path having a next nearest adapter SRAD to the buffer SRAD until a path is selected that is not overloaded. If the driver 311 determines 408 that the selected path is not overloaded, the driver is configured to send 304 the I/O request along to the storage device via the selected path. In some embodiments, other factors besides path overloading may be considered in step 408. For example, the determination 408 may be one of path quality instead of path overloading. In another embodiment, multiple such factors may be considered at once or in succession.

In view of the explanations set forth above, readers will recognize that the benefits of dynamic path selection based on SRAD of I/O buffers and adapters according to embodiments of the present disclosure include:

Increasing system performance by decreasing overall I/O latency in MPIO systems.

Increasing system efficiency by better selecting paths that optimize computer performance and minimizing latency.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for dynamic path selection based on Scheduler's Resource Allocation Domain (SRAD), the method comprising:
   receiving, by a driver, an allocation of an input/output (I/O) buffer for an I/O request targeting a storage device;
   selecting a path to the storage device for carrying out the I/O request based on a buffer SRAD associated with the I/O buffer; and
   sending the I/O request via the selected path.

2. The method of claim 1, wherein selecting the path includes:
   identifying the buffer SRAD associated with the I/O buffer responsive to receiving the V/O buffer; and
   selecting, based on a determination that a potential path exists to an adapter having an adapter SRAD that matches the buffer SRAD, the potential path for carrying out the I/O request.

3. The method of claim 1, wherein selecting the path includes:
   identifying the buffer SRAD associated with the I/O buffer responsive to receiving the I/O buffer; and
   selecting, based on a determination that a potential path does not exist to an adapter having an adapter SRAD that matches the buffer SRAD, a second path to a second adapter having an adapter SRAD closest to the buffer SRAD.

4. The method of claim 1, further comprising:
   determining, prior to sending the I/O request via the selected path, whether the selected path is overloaded; and
   selecting, based on the selected path being overloaded, an alternative path for carrying out the I/O request.

5. The method of claim 4, wherein determining whether the selected path is overloaded includes comparing an I/O rate associated with the selected path with an I/O path threshold.

6. The method of claim 4, wherein selecting the alternative path for carrying out the I/O request includes:
   identifying the buffer SRAD associated with the I/O buffer responsive to receiving the I/O buffer; and selecting a second path to an adapter having an adapter SRAD closest to the buffer SRAD, wherein the second path is not overloaded.

7. The method of claim 1, wherein the buffer SRAD associated with the I/O buffer is identified using kernel services.

8. A computer system for dynamic path selection based on Scheduler's Resource Allocation Domain (SRAD), the computer system comprising:
   a processor set;
   one or more computer-readable storage media; and
   program instructions stored on the one or more computer-readable storage media configured to cause the processor set to perform operations comprising:
      receiving, by a driver, an allocation of an input/output (I/O) buffer for an I/O request targeting a storage device;
      selecting a path to the storage device for carrying out the I/O request based on a buffer SRAD associated with the I/O buffer; and
      sending the I/O request via the selected path.

9. The computer system of claim 8, wherein selecting the path includes:
   identifying the buffer SRAD associated with the I/O buffer responsive to receiving the I/O buffer; and
   selecting, based on a determination that a potential path exists to an adapter having an adapter SRAD that matches the buffer SRAD, the potential path for carrying out the I/O request.

10. The computer system of claim 8, wherein selecting the path includes:
   identifying the buffer SRAD associated with the I/O buffer responsive to receiving the I/O buffer; and
   selecting, based on a determination that a potential path does not exist to an adapter having an adapter SRAD that matches the buffer SRAD, a second path to a second adapter having an adapter SRAD closest to the buffer SRAD.

11. The computer system of claim 8, wherein the operations further comprise:
   determining, prior to sending the I/O request via the selected path, whether the selected path is overloaded; and
   selecting, based on the selected path being overloaded, an alternative path for carrying out the I/O request.

12. The computer system of claim 11, wherein determining whether the selected path is overloaded includes comparing an I/O rate associated with the selected path with an I/O path threshold.

13. The computer system of claim 11, wherein selecting the alternative path for carrying out the I/O request includes:
   identifying the buffer SRAD associated with the I/O buffer responsive to receiving the I/O buffer; and
   selecting a second path to an adapter having an adapter SRAD closest to the buffer SRAD, wherein the second path is not overloaded.

14. The computer system of claim 8, wherein the buffer SRAD associated with the I/O buffer is identified using kernel services.

15. A computer program product for dynamic path selection based on Scheduler's Resource Allocation Domain (SRAD), the computer program product comprising:
   one or more computer-readable storage media; and
   program instructions stored on the one or more computer-readable storage media configured to perform operations comprising:

receiving, by a driver, an allocation of an input/output (I/O) buffer for an I/O request targeting a storage device;

selecting a path to the storage device for carrying out the I/O request based on a buffer SRAD associated with the I/O buffer; and sending the I/O request via the selected path.

16. The computer program product of claim 15, wherein selecting the path includes:

identifying the buffer SRAD associated with the I/O buffer responsive to receiving the I/O buffer; and selecting, based on a determination that a potential path exists to an adapter having an adapter SRAD that matches the buffer SRAD, the potential path for carrying out the I/O request.

17. The computer program product of claim 15, wherein selecting the path includes:

identifying the buffer SRAD associated with the I/O buffer responsive to receiving the I/O buffer; and selecting, based on a determination that a potential path does not exist to an adapter having an adapter SRAD that matches the buffer SRAD, a second path to a second adapter having an adapter SRAD closest to the buffer SRAD.

18. The computer program product of claim 15, wherein the operations further comprise:

determining, prior to sending the I/O request via the selected path, whether the selected path is overloaded; and selecting, based on the selected path being overloaded, an alternative path for carrying out the I/O request.

19. The computer program product of claim 18, wherein determining whether the selected path is overloaded includes comparing an I/O rate associated with the selected path with an I/O path threshold.

20. The computer program product of claim 18, wherein selecting the alternative path for carrying out the I/O request includes:

identifying the buffer SRAD associated with the I/O buffer responsive to receiving the I/O buffer; and selecting a second path to an adapter having an adapter SRAD closest to the buffer SRAD, wherein the second path is not overloaded.

\* \* \* \* \*